(12) United States Patent
Schwoerer et al.

(10) Patent No.: US 9,034,462 B2
(45) Date of Patent: May 19, 2015

(54) METAL-CUTTING MACHINING METHOD AND SEMI-FINISHED PRODUCT

(75) Inventors: Christian Schwoerer, Hamburg (DE); Eckehard Zündorf, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 981 days.

(21) Appl. No.: 12/450,554

(22) PCT Filed: Mar. 17, 2008

(86) PCT No.: PCT/EP2008/053177
§ 371 (c)(1),
(2), (4) Date: Oct. 14, 2009

(87) PCT Pub. No.: WO2008/119656
PCT Pub. Date: Oct. 9, 2008

(65) Prior Publication Data
US 2010/0122562 A1 May 20, 2010

Related U.S. Application Data

(60) Provisional application No. 60/908,982, filed on Mar. 30, 2007.

(30) Foreign Application Priority Data

Mar. 30, 2007 (DE) .......................... 10 2007 015 795

(51) Int. Cl.
*B32B 7/04* (2006.01)
*B32B 7/06* (2006.01)
(Continued)

(52) U.S. Cl.
CPC .............. *B23B 35/005* (2013.01); *B32B 27/36* (2013.01); *C09J 133/04* (2013.01); *B23B 7/06* (2013.01);
(Continued)

(58) Field of Classification Search
None
See application file for complete search history.

(56) References Cited

U.S. PATENT DOCUMENTS 3,507,740 A * 4/1970 Gaspari .......................... 428/42.2
3,579,926 A * 5/1971 Gaspari .......................... 451/442
(Continued)

FOREIGN PATENT DOCUMENTS

CN 2678805 2/2005
DE 19822810 * 11/1999
(Continued)

OTHER PUBLICATIONS

International Search Report for PCT/EP2008/053177, mailed Aug. 8, 2008.
(Continued)

*Primary Examiner* — Vivian Chen
(74) *Attorney, Agent, or Firm* — Jenkins, Wilson, Taylor & Hunt, P.A.

(57) ABSTRACT

The invention relates to a metal-cutting machining process for a semi-finished product having a predetermined shape and at least one machining surface which has the steps: applying a protective foil having a predetermined elongation at break to the at least one machining surface with a predetermined adhesive force, placing a metal-cutting tool in a predetermined position above the machining surface, exerting a predetermined mechanical force in a predetermined direction for a predetermined length of time to the tool for carrying out a metal-cutting process on the semi-finished product and lifting the tool from the at least one machining surface after the predetermined length of time. In order to protect the semi-finished products from damage through the machining residues and at the same time not to impair the drilling performance, according to the invention through the adhesion an adhesive force is produced between the protective foil and the machining surface of substantially 10 N/25 mm and a protective foil is used which has an elongation at break of between 80 and 120%.

7 Claims, 1 Drawing Sheet

(51) Int. Cl.
- *B32B 15/08* (2006.01)
- *B32B 15/09* (2006.01)
- *B32B 27/30* (2006.01)
- *B32B 27/36* (2006.01)
- *B32B 38/00* (2006.01)
- *B32B 38/10* (2006.01)
- *C09J 7/00* (2006.01)
- *C09J 7/02* (2006.01)
- *C09J 133/04* (2006.01)
- *C09J 133/06* (2006.01)
- *B23B 35/00* (2006.01)
- *B23D 81/00* (2006.01)
- *B23B 7/06* (2006.01)
- *B32B 7/12* (2006.01)
- *B32B 15/082* (2006.01)

(52) U.S. Cl.
CPC .............. *B23D 81/00* (2013.01); *C09J 133/06* (2013.01); *B32B 7/04* (2013.01); *B32B 38/0004* (2013.01); *B32B 7/12* (2013.01); *C09J 7/02* (2013.01); *B32B 38/10* (2013.01); *B32B 15/082* (2013.01); *B32B 15/09* (2013.01); *B23B 2226/61* (2013.01); *B23B 2215/04* (2013.01)

(56) References Cited

U.S. PATENT DOCUMENTS

| | | | | |
|---|---|---|---|---|
| 4,508,875 A * | 4/1985 | Kishida et al. | ................ | 525/308 |
| 4,808,046 A * | 2/1989 | Pilkington et al. | ............ | 409/132 |
| 5,111,572 A * | 5/1992 | Haiml et al. | ................ | 29/469.5 |
| 5,127,974 A * | 7/1992 | Tomiyama et al. | ............. | 156/85 |
| 5,227,009 A * | 7/1993 | Sunakawa et al. | .............. | 216/49 |
| 5,294,278 A * | 3/1994 | Matsui et al. | ................ | 156/248 |
| 5,641,714 A * | 6/1997 | Yamanaka | ...................... | 438/14 |
| 5,785,465 A * | 7/1998 | Korbonski | .................... | 408/1 R |
| 6,057,041 A * | 5/2000 | Sumi et al. | .................... | 428/447 |
| 7,799,853 B2 * | 9/2010 | Ukei et al. | ...................... | 524/99 |
| 8,022,139 B2 * | 9/2011 | Kurihara et al. | ................ | 525/88 |
| 2001/0055679 A1 * | 12/2001 | Schumann et al. | ........... | 428/352 |
| 2002/0001723 A1 * | 1/2002 | Fuchs | ......................... | 428/424.4 |
| 2004/0118813 A1 * | 6/2004 | Lai | ................. | 216/84 |
| 2005/0223537 A1 * | 10/2005 | Hamilton et al. | ............ | 29/527.4 |
| 2006/0263620 A1 * | 11/2006 | Vanderstappen et al. | ..... | 428/515 |

FOREIGN PATENT DOCUMENTS

| | | |
|---|---|---|
| DE | 199 60 466 | 9/2001 |
| DE | 100 15 708 | 2/2002 |
| DE | 20 2006 014 552 | 12/2006 |
| EP | 0 385 970 | 9/1990 |
| EP | 1 138 735 | 10/2001 |
| JP | 07-026210 * | 1/1995 |
| JP | 07-062300 * | 3/1995 |
| JP | 08-073822 * | 3/1996 |
| SU | 627605 | 10/1978 |
| SU | 1230778 | 5/1986 |
| WO | WO 2007/060930 * | 5/2007 |

OTHER PUBLICATIONS

German Examination Report dated Oct. 23, 2007 for DE 10 2007 015 795.0-14.
International Search Report and Written Opinion dated Aug. 8, 2008 for PCT/EP2008/053177.
German Examination Report dated Apr. 27, 2010 for DE 10 2007 015 795.0-14.

\* cited by examiner

METAL-CUTTING MACHINING METHOD AND SEMI-FINISHED PRODUCT

CROSS-REFERENCE TO RELATED APPLICATION

This application is the U.S. national phase of International Application No. PCT/EP2008/053177 filed 17 Mar. 2008, which designated the U.S. and claims priority to DE Application No. 10 2007 015 795.0 filed 30 Mar. 2007, and this application claims priority from U.S. Provisional Application No. 60/908,982 filed 30 Mar. 2007; the entire contents of each of the above applications are hereby incorporated by reference.

TECHNICAL FIELD

The invention relates to a metal-cutting machining method and more particularly to a method for the protection of surfaces as well as to a corresponding semi-finished product according to the preamble of claim 1 and claim 4 respectively.

BACKGROUND

During metal-cutting machining of surfaces these surfaces are frequently covered with stick-on foils to protect the surface from the effects of foreign bodies, i.e. from damage through tools or machining residues, with these foils having to be removed again after the surface has been machined. Foils which are coated with an adhesive are also used to protect the surface when transporting component parts having large surface areas, such as for example the surfaces of refined steel plates or lacquered new vehicles. The foils can consist of different materials. In particular the protective foils are made from polyolefins, i.e. polyethylene (PE) or polypropylene (PP). Polyolefins have an elongation at break of more than 200%.

Protective foils of this kind are also used in aircraft construction throughout the entire structural manufacturing process in order to prevent damage to the exterior skin of the aircraft body during its machining. These machining processes are in particular drilling into the exterior skin for fitting connecting elements.

The said commercially available protective foils have the drawback however that when drilling, for example into the aircraft exterior skin, the foils become loose in the area of the exterior skin around the bore holes so that a tent-like cavity can form between the foil and the exterior skin of the aircraft. The transition from the protective foil lying directly thereon to the detached protective foil is blurred, a precisely defined border line between the two areas does not exist. When the foil becomes detached its protective action around the edge of the bore is limited or becomes completely lost. Furthermore the detached foil can become lodged in the channels of a drill thereby obstructing the forward propulsion of the drill. Precision drilling is then no longer possible or only possible with restricted conditions. Residues of this kind can also remain when tearing off the foil so that they become jammed between a component part and a connecting element for connecting two component parts and thus can lead to an unstable connection.

SUMMARY

The object of the invention is therefore to provide a metal-cutting machining method in which the semi-finished products are protected from damage through machining residues without impairing the drilling efficiency. Furthermore a correspondingly pre-machined semi-finished product is similarly to be provided.

This is achieved through the metal-cutting machining method according to claim 1 and the semi-finished product according to claim 4. Preferred embodiments of the invention form the subject of the relevant dependent claims.

The invention is based on the fact that a foil is applied to the surface to be machined which has a lower elongation at break. In order to guarantee optimum adhesion between the foil and surface the foil is coated with an adhesive which on the one hand ensures sufficient adhesion and on the other can be easily removed from the surface once machining has been completed. The adhesion of the foil to the surface and the elongation at break of the foil must thereby be matched in optimum manner to one another.

The metal-cutting machining method according to the invention for a semi-finished product having a predetermined shape and at least one machining surface, which has the steps: sticking a protective foil having a predetermined elongation at break onto the at least one machining surface with a predetermined adhesive force, placing a metal-cutting tool in a predetermined position above the machining surface, exerting a predetermined mechanical force in a predetermined direction over a predetermined length of time onto the tool for carrying out a metal-cutting process in the case of the semi-finished product and lifting the tool from the at least one machining surface after the predetermined length of time, is characterised in that through the sticking process an adhesive force is generated between the protective foil and the machining surface of substantially 10 N/25 mm and a protective foil is used which has an elongation at break of between 80 and 120%.

In particular the method has in a preferred embodiment as a further step or—where technically possible and advisable—as further steps:

that the at least one machining surface is provided with a primer layer on which the protective foil is stuck, and
that the method has at least one drilling process with a drill.

Correspondingly the semi-finished product according to the invention having a predetermined shape with at least one machining surface for a metal-cutting machining method with the steps: placing a metal-cutting tool in a predetermined position above the at least one machining surface, exerting a predetermined mechanical force over a predetermined length of time in a predetermined direction onto the tool for carrying out a metal-cutting process on the semi-finished product and lifting the tool from the at least one machining surface after the predetermined length of time, wherein the semi-finished product comprises a protective foil on the at least one machining surface which is stuck on with a predetermined adhesive force, is characterised in that an adhesive force exists between the protective foil and the machining surface of the semi-finished product of substantially 10 N/25 mm and the protective foil has an elongation at break of between 80 and 120%.

More particularly the semi-finished product has in a preferred embodiment as a further feature or—where technically possible and advisable—as further features:

that the protective foil has a thickness of 100 µm;
that the protective foil consists of PET (polyethylene terephthalate);
that the protective foil is coated with an acrylate dispersion adhesive;
that the adhesive layer has a thickness of 25 µm and
that a primer layer is provided between the at least one machining surface and the acrylate dispersion adhesive layer.

The invention has inter alia the following advantages: Due to the low elongation at break of the foil material the foil is cut away during the drilling process by the drilling tool. When countersink drilling the foil is likewise countersunk. A connecting element can thereby be used with countersunk head when the foil is applied without the foil lying between the component part and countersunk head. The adhesion capacity (the adhesive force) of the foil on the surface to be protected is sufficient to prevent the foil from becoming detached in the area around the bore but on the other hand is low enough to remove the foil over a large surface area, i.e. without tearing the foil, and without auxiliary means.

BRIEF DESCRIPTION OF THE DRAWINGS

Further advantages and features of the invention are apparent from the following description of embodiments, with reference to the accompanying drawings.

DETAILED DESCRIPTION

Figure 1:
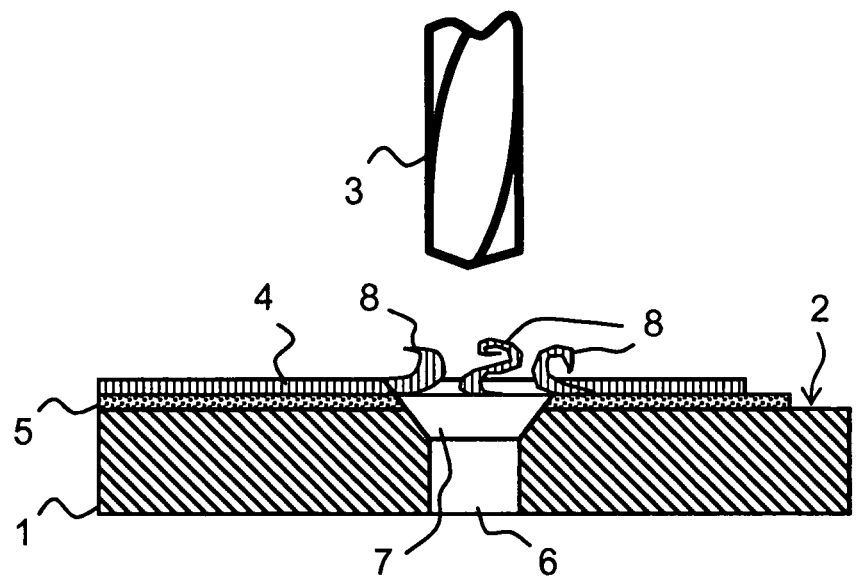
FIG. 1 shows a cross-section through a semi-finished product with a protective foil according to the prior art.

The drawing is not to scale. The same or similarly acting elements are provided with the same reference numerals.

In the following the term "cutting" is to mean the machining of the semi-finished product with geometrically specific or non-specific cuts, thus in particular the drilling of blind holes or through-holes in a workpiece.

FIG. 1 shows a cross-section through a semi-finished product 1. A drilling hole is to be produced in a surface 2 of the semi-finished product 1 by a metal-cutting tool 3, here a drill. In order to prevent damage to the surface 2 through chippings, a protective foil 4 is stuck onto the surface 2 according to prior art. Prior to the start of the work the foil 4 is applied undrilled to the surface 2 to be protected and then during production of the bores and fitting the connecting elements prevents foreign bodies from acting on the surface 2 (exterior skin). For this an adhesive layer 5 is provided between the surface 2 and the protective foil 4 and prevents the foil 4 from slipping on the surface 2 during the course of machining the surface 2 with the tool 3.

The drill 3 is then placed in a predetermined position above the surface 2 and lowered onto the surface 2. It pierces through the protective foil 4 and the adhesive layer 5 in order then to penetrate into the surface 2. For a predetermined length of time a mechanical force is then exerted in the desired direction onto the drill 3. In this way for example a hole 6 is produced in the semi-finished product 1 and where necessary provided with a countersunk area 7 in the surface 2. At the end of the machining process, i.e. after a previously set length of time the drill 3 is lifted away from the machining surface 2 and moved to a further machining position (not shown). The described process is then repeated there.

When all such machining processes on the surface 2 have been concluded the protective foil 4 together with the adhesive layer 5 is removed from the surface 2 without leaving any residue and the semi-finished product 1 is prepared for further machining with different means (not shown) or is ready for installation into a larger unit (not shown).

In the prior art the foils can be made from different materials, more particularly from polyolefins such as polyethylene (PE) or polypropylene (PP). Polyolefins have an elongation at break of more than 200%. Therefore it may happen that when drilling the roil 4 becomes loose away from the machining surface 2 in the area around the bore hole and a tent-like hollow cavity forms between the foil 4 and the surface 2. As a result the foil 4 extends a great deal locally at the bore hole 6, 7 before tearing. Flap-like residues 8 of the foil 4 can thereby arise next to the bore hole 6, 7. These residues 8 are foil parts which are drawn along by the drill 3 as it rotates, and they only tear when the elongation at break is reached. They then keep this length substantially, get into the drilling channels of the drilling tool 3 and clog them up. The transition from the protective foil 4 resting directly thereon remote from the bore 6 to the detached protective foil immediately next to the bore 6 is blurred, without any precisely defined border line between the two areas. When the foil becomes detached its protective action in the area around the edge of the bore is restricted or is even lost completely. Furthermore through the material in the channels of the drill 3 the forward propulsion of the drill 3 in the direction of the semi-finished product 1 becomes impeded, and precision drilling is no longer possible or only possible to a restricted amount. Finally as a result of the residues of the foil in the drill hole 6 with countersunk area 7 a connecting element (not shown) with countersunk head can no longer be inserted whilst the foil is attached without the foil 4 becoming detached since otherwise the foil residues 8 come to lie between the component part (semi-finished product 1) and countersunk head of a screw (not shown). This would result in an unstable connection.

Since in the case of aircraft construction throughout the entire structural manufacturing process the precision of the bore holes is of particular importance and the demands on the reliability of the connections are extremely high it is essential that such obstacles are avoided.

As known by the inventors it is therefore of great importance for the machining of the surface 2 in the manner and way described above that the adhesive force of the protective foil 4 on the surface 2 and the elongation at break of the protective foil 4 are matched with one another. Through tests which were also carried out under various different climatic conditions the inventors discovered that an adhesive force of the adhesive between the protective foil and the machining surface of essentially 10 N/25 mm in conjunction with an elongation at break of the protective foil between 80 and 120% is optimum.

Figure 2:
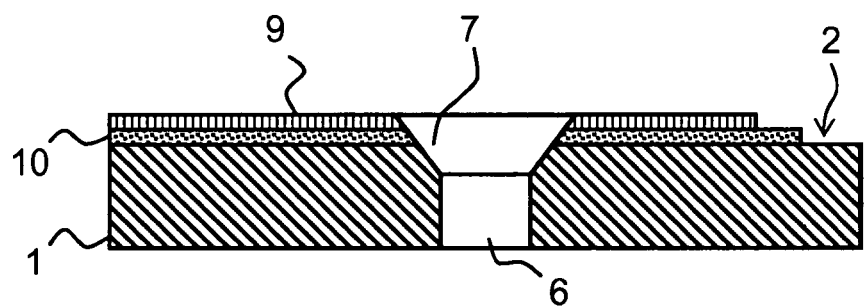
FIG. 2 shows a cross section through a first embodiment of the semi-finished product according to the invention with a PET foil according to the invention.

According to the invention therefore a foil 9 is used which consists of polyethylene terephthalate (PET) and which has an elongation at break of 80-120% instead of >200% as in the case of polyolefins. The adhesive capacity of the adhesive layer 5 between the foil 9 and the surface 2 is fixed at about 10 N/25 mm. As shown in FIG. 2 with these values there is no longer any formation of residues 8 of the foil, the drill is no longer impeded in its movement about its own axis or in forward propulsion. The said values can be set particularly advantageously with an acrylate dispersion adhesive as adhesive layer 10 between the foil 9 and the machining surface 2. Furthermore the desired behaviour of the foil 9 becomes enhanced if this foil has a thickness of 100 μm and the adhesive layer 10 according to the invention has a thickness of 25 μm.

As a result of the cutting of the foil according to the invention with the adhesive according to the invention it is furthermore possible to use a connecting element with countersunk head when the foil is applied without the foil lying between the component part and countersunk head.

Figure 3:
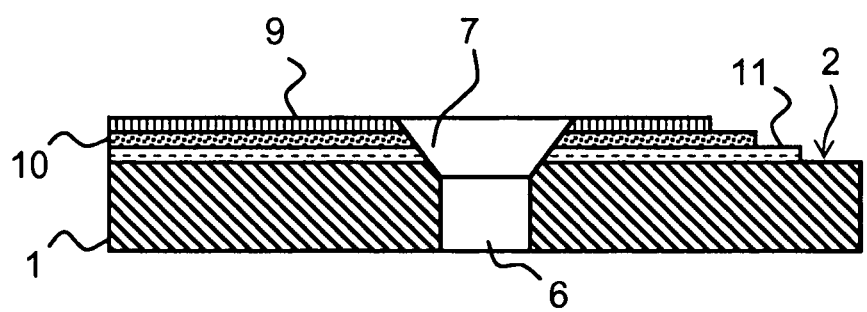
FIG. 3 shows the cross-section through a second embodiment of the semi-finished product according to the invention with a PET foil according to the invention.

In FIG. 3 an embodiment of the semi-finished product according to the invention is shown in which for better adjustability of the adhesive force of the foil 9 on the surface 2 a primer layer 11 is applied to the surface 2 before the foil 9 is applied with adhesive 5. In this way the adhesion between the layers can be define more precisely. In particular Seevenax 113-22 (Trade name) is suitable as a primer for this.

REFERENCE NUMERALS

1 Semi-finished product
2 Machining surface
3 Metal-cutting machining tool, drill
4 Protective foil according to prior art
5 Adhesive layer
6 Drill hole
7 Counter-sunk head
8 Drilling residues, chippings
9 Protective foil according to invention
10 Acrylate dispersion adhesive layer
11 Primer layer

The invention claimed is:

1. A metal-cutting machining method for a semi-finished product having a predetermined shape and at least one machining surface, the method comprising:
   sticking a protective foil having a predetermined elongation at break onto the at least one machining surface with a predetermined adhesive force, wherein the protective foil is coated with an acrylate dispersion adhesive;
   setting a cutting tool in a predetermined position above the machining surface;
   exerting a predetermined mechanical force in a predetermined direction over a predetermined length of time on the tool for carrying out a machine-cutting process on the semi-finished product; and
   lifting the tool away from the at least one machining surface after the predetermined length of time,
   wherein a primer layer is provided on the machining surface, an adhesive force exists between the protective foil and the machining surface of the semi-finished product of 10 N/25 mm and the protective foil has an elongation at break of between 80 and 120%.

2. The metal-cutting machining method according to claim 1 comprising at least a drilling process with a drill.

3. A semi-finished product with a predetermined shape with at least one machining surface for a metal-cutting machining method with the steps:
   setting a metal-cutting tool in a predetermined position above the at least one machining surface;
   exerting a predetermined mechanical force over a predetermined period of time in a predetermined direction on the tool for carrying out a metal-cutting process on the semi-finished product; and
   lifting the tool away from the at least one machining surface after the predetermined length of time,
   wherein the semi-finished product comprises a protective foil on the at least one machining surface which is stuck on with a predetermined adhesive force, wherein the protective foil is coated with an acrylate dispersion adhesive,
   wherein a primer layer is provided on the machining surface, an adhesive force exists between the protective foil and the machining surface of the semi-finished product of 10 N/25 mm and the protective foil has an elongation at break of between 80 and 120%.

4. The semi-finished product according to claim 3 wherein the protective foil has a thickness of 100 μm.

5. The semi-finished product according to claim 3 wherein the protective foil consists of PET (polyethylene terephthalate).

6. The semi-finished product according to claim 3 wherein the adhesive layer has a thickness of 25 μm.

7. The semi-finished product according to claim 3 wherein the primer layer is provided between the at least one machining surface and the acrylate dispersion adhesive layer.

* * * * *